(12) United States Patent
Stephens

(10) Patent No.: US 6,631,043 B1
(45) Date of Patent: Oct. 7, 2003

(54) ELIMINATION OF THREE PASS WRITE

(75) Inventor: Ronald J. Stephens, San Jose, CA (US)

(73) Assignee: Iomega Corporation, San Diego, CA (US)

(*) Notice: Subject to any disclaimer, the term of this patent is extended or adjusted under 35 U.S.C. 154(b) by 284 days.

(21) Appl. No.: 09/777,486

(22) Filed: Feb. 5, 2001

Related U.S. Application Data

(60) Provisional application No. 60/180,069, filed on Feb. 3, 2000.

(51) Int. Cl.[7] .................................................. G11B 5/02
(52) U.S. Cl. ............................... 360/25; 360/27; 360/69
(58) Field of Search ........................... 360/25, 27, 48, 360/69, 55, 60; G11B 5/02

(56) References Cited

U.S. PATENT DOCUMENTS

| | | | |
|---|---|---|---|
| 4,853,799 A | * | 8/1989 | Aikawa ........................ 360/48 |
| 4,901,169 A | | 2/1990 | Hamaika et al. ............... 360/66 |
| 5,329,510 A | | 7/1994 | Tsuyuguchi et al. .......... 369/47 |
| 5,363,255 A | * | 11/1994 | Ivers et al. ............... 360/77.03 |
| 5,777,813 A | | 7/1998 | Sun et al. ..................... 360/66 |
| 6,239,934 B1 | * | 5/2001 | Sun et al. ..................... 360/69 |

FOREIGN PATENT DOCUMENTS

EP        0 692 782 A2     1/1996

\* cited by examiner

*Primary Examiner*—David Hudspeth
*Assistant Examiner*—Dan I. Davidson
(74) *Attorney, Agent, or Firm*—Woodcock Washburn LLP

(57) ABSTRACT

An apparatus and method that allow for the compatibility of data-storage disks with disk drives is provided. In an illustrative implementation, an exemplary disk drive for use on data storage disks reads the control logic sector of cooperating data-storage disks for a compatibility indicator. If the disk is compatible the drive performs read/write operations. If the disk is incompatible, the indicator is overwritten to ensure compatibility. From there read/write operations are allowed. The processing may be realized by machine instructions present in a control circuit of the disk drive.

6 Claims, 4 Drawing Sheets

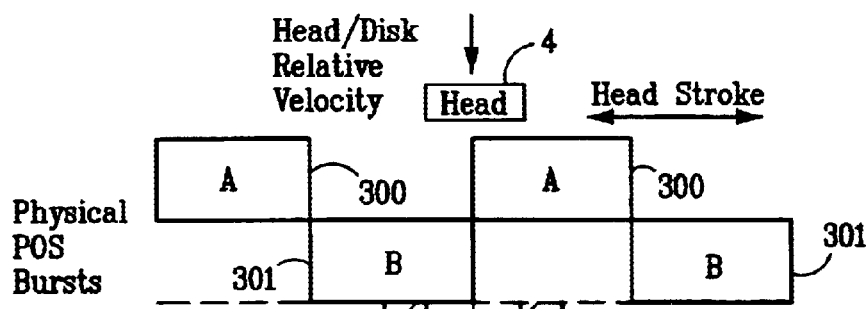
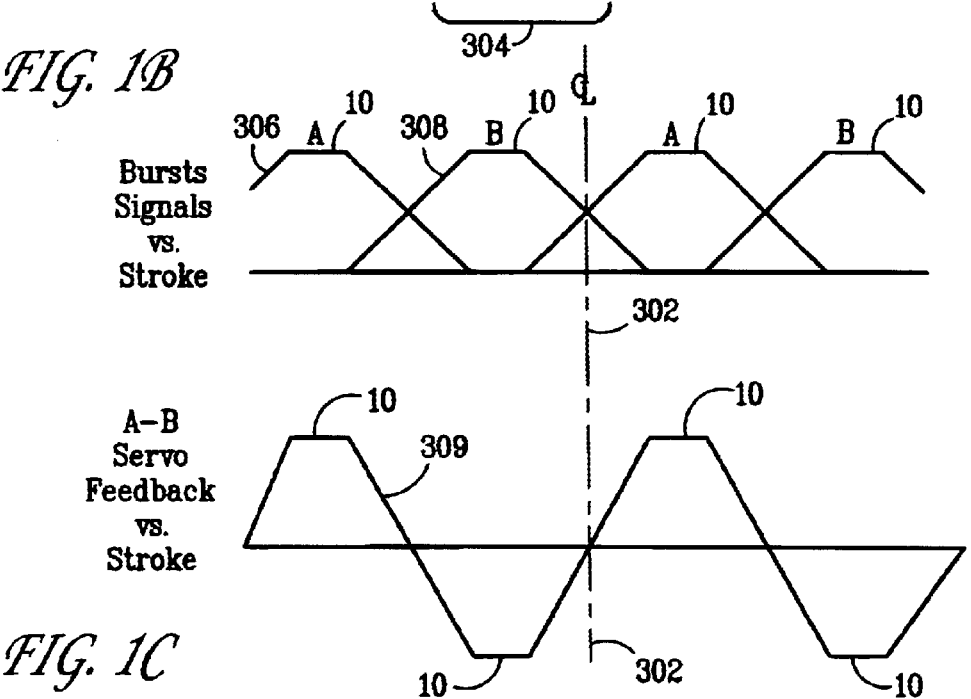

ELIMINATION OF THREE PASS WRITE

This Application: claims benefit of U.S. provisional Application Ser. No. 60/180,069, filed Feb. 3, 2000, incorporated by reference herein in it entirety.

FIELD OF THE INVENTION

The field of the present invention relates to removable cartridge disk drives in general, and more particularly, to a removable cartridge disk drive and system which provides downward compatibility for removable cartridges of different disk storage capacities and characteristics.

BACKGROUND

Removable disk cartridges have been available on the market for some time. Unlike fixed disk drive systems, removable disk cartridge systems enable a user to easily replace a high capacity disk, allowing for convenient exchange of large amounts of information between remote sites and for greatly increased system storage capacity.

Removable disk technology continues to advance, providing the user with cartridges and disk drives of increasing performance and data storage capacity. These advancements are universally beneficial, leading to less cost per unit of data stored and enhanced accuracy of data storage and retrieval operations. Nevertheless, problems associated with technological advancement do occur. One of the most critical problems in the area of removable cartridge technology concerns upward and downward compatibility.

Because removable disk cartridges are by definition removable, they can be used interchangeably between one disk product and another. Thus, a removable cartridge originally designed for an older, lower-capacity disk drive can often be inserted in a newer, higher-capacity disk drive and data can be written on or read from the disk in the lower-capacity cartridge by the read/write head in the higher-capacity drive. However, after the higher-capacity drive writes on a lower-capacity cartridge, difficulties may occur when the re-written lower-capacity cartridge is reinserted back into the older, lower-capacity disk drive. One reason for this difficulty is that the read/write head width and associated track pitch of the higher-capacity disk drive are usually smaller than the head width and associated track pitch of the lower capacity disk drive. As a result, portions of the old data signals recorded in a given track by the lower-capacity disk drive remain in "sidebands" on either side of the data newly recorded in the higher-capacity disk drive, giving rise to a potential for interference when the lower-capacity disk drive performs read operations.

The sideband phenomenon is illustrated in FIG. 1A which depicts an A/B servo pattern recorded on a lower capacity removable disk cartridge over a localized track region. As can be seen from FIG. 1A, the recording data in a data track 2 of a removable cartridge originally designed for a lower-capacity disk drive, using a read/write head 4 of a higher-capacity disk drive, leaves inner and outer sidebands 6, 8 containing portions of the old data signals recorded in the data track by the (wider) read/write head (not shown) of the lower-capacity disk drive. If the removable cartridge with the new data recorded on it is subsequently removed from the higher-capacity disk drive and reinserted into the lower-capacity disk drive, these inner and outer sidebands will create interference during the read operation in the lower-capacity drive. Stray or random flux intervals in the sidebands will impact on the lower-density read/write head as it passes over the data recorded by the high-density head, leading to spurious or corrupted data readings.

Several techniques have been developed to remove sideband interference in lower-capacity removable cartridges containing data re-recorded with a higher-density read/write head. For example, a device receiving a disk, may perform a DC erase of the old data originally recorded on the lower-capacity disk by the first-generation, lower-density read/write head when new data is to be stored on the disk of lower-capacity cartridge using the higher-density read/write head. As shown in FIGS. 2A–2B, erasing may be accomplished by injecting a "static"or DC offset signal into the track following feedback loop of the disk device so as to reposition the smaller, high-density head over the inner and outer sidebands of each data track during erase operations.

However, difficulties may be encountered when using the prior art static offset technique to eliminate sideband interference when a higher-density head writes data over a lower-density data track. These difficulties are apparent upon consideration of FIG. 2C. As can be seen in FIG. 2C, application of the static offset to eliminate the sideband on either side of track centerline produces a constant state offset condition wherein the higher-density head is located along a region of the A/B servo feedback waveform unacceptably near the saturation region of the waveform. Small deviations from the optimum head offset position during the sideband erasing operation can move the head into the saturation region, resulting in no useful feedback, and, in effect, loss of some disk device functionality. In addition, the dc offset technique is time and processing intensive as the disk device is required to perform multiple erase passes. Further the erase passes greatly degrade performance of writing first-generation media on a second-generation drive.

From the foregoing it is appreciated that there exists a need for an apparatus and methods that allow for a performance-independent solution to the described problem. By having such an apparatus and method, true downward capability for older cartridges recorded in lower-capacity disk drives can be realized in higher-capacity disk drives.

SUMMARY OF THE INVENTION

The present invention provides a method and apparatus allowing first generation storage media to efficiently cooperate with subsequent generation storage media devices. When first generation storage media is first received by subsequent generate storage media devices, the subsequent generation storage media device reads the storage media for a specific stored signals having format information. Upon the detection of the stored signal format information, the second generation storage media device processes the stored signal format information to determine if the storage media is in accordance with the second generation storage media device format. If the format is in accordance, the second generation storage media device then performs storage media device operations on the media. The contrary being true, the second generation media device updates the stored signal format information such that the storage media becomes in accordance with the second generation storage media device.

In the event that an updated first generation storage media is placed in a first generation storage media device, the first generation storage media device updates the stored signal format information to make the storage media compliant with the first generation storage media device format. The first generation storage media device is then capable of performing first generation storage media device operations on the first generation storage media.

In both scenarios, any information found on the first generation storage media will be discarded by subsequent first or second generation storage media device operations.

BRIEF DESCRIPTION OF THE FIGURES

The objects and advantages of the invention will become more apparent and more readily appreciated from the following detailed description of presently preferred exemplary embodiments of the invention taken in conjunction with the accompanying drawings of which:

FIG. 1A is a representative view of a data track recorded on the surface of a disk in a lower-capacity removable disk cartridge, showing the dimensional relationship between a higher-density read/write head and the lower-density track pitch, and also showing a typical A/B servo pattern recorded on the disk surface by a lower-density read/write head;

FIG. 1B depicts the A/B burst amplitude signal associated with the A/B servo pattern of FIG. 1A;

FIG. 1C, depicts A/B servo feedback waveform associated with the A/B servo pattern of FIG. 1A;

DESCRIPTION OF A ILLUSTRATIVE IMPLEMENTATION

Overview

Figure 2A:
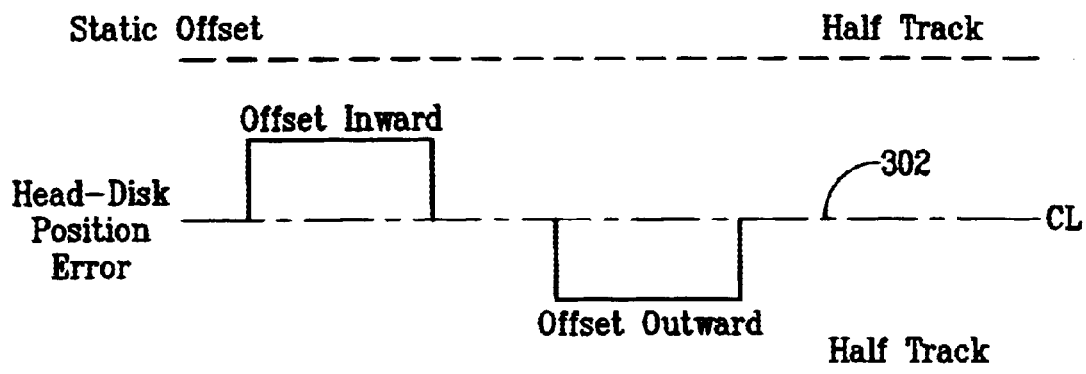
FIGS. 2A–2B illustrate a prior art technique for injecting "static" offset into the track following loop of a removable cartridge disk drive in order to eliminate sideband interference which otherwise results from recording data on a lower-density disk in a lower-capacity removable disk cartridge with a higher-density read/write head.
Figure 2B:
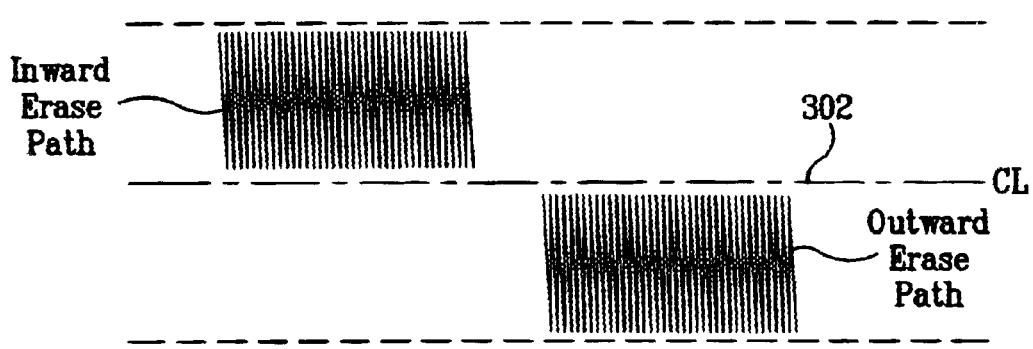

When data is to be recorded on a disk, the recording density depends on the gap length of the read/write head. More specifically, as the gap length is elongated, the disk track is enlarged. However, the resolution is decreased, and hence it is not desirable for a read/write operation in a high-density recording disk. On the other hand, as the gap length is shortened, the track size becomes narrower, thereby degrading the overwrite characteristic. For this reason, it is not desirable for a read/write operation in a low-density disk. Accordingly, a disk to be used is selected on the basis of the gap length of the read/write head. However, a floppy disk drive apparatus must have compatibility with both high- and low-density disks.

In a conventional disk device, a magnetic head using a tunnel erase system is often used. Generally, in this system, data written in a recording area is erased by overwrite. If data is written on a disk, which has been used in a disk device including a read/write head having a long gap length, using a disk device for high-density recording, i.e., including a read/write head having a short gap length, the surface of the disk is magnetized by the newly written data. However, residual magnetization, known as sideband interference is present in a portion of the disk. As a result, the overwrite characteristic is degraded, and hence low- and high-density recording cannot be performed by a single apparatus.

The sideband phenomenon is illustrated in FIG. 1A, which depicts an A/B servo pattern recorded on a lower capacity removable disk cartridge over a localized track region. As can be seen from FIG. 1A, the recording of data in a data track 2 of a removable cartridge originally designed for a lower-capacity disk drive, leaves inner and outer side-bands 6,8 containing portions of the old data signals recorded in the data track by the (wider) read/write head (not shown) of the lower capacity disk drive. If the removable cartridge with the new data recorded on its is subsequently removed from the higher-capacity disk drive and reinserted into the lower-capacity disk drive, these inner and outer sidebands will create interference during the read operation in the lower-capacity disk drive. Stray or random flux reversals in the sidebands will impact on the lower-density read/write head as it passes over the data recorded by the high-density head, leading to spurious or corrupted data readings.

Several techniques have been developed to eliminate sideband interference in lower-capacity removable cartridges containing data re-recorded with a higher density read/write head. Many removable cartridge disk drive products employ the well-known embedded A/B servo burst scheme for track following. FIG. 1A shows an A/B type servo pattern followed by a data field recorded on the surface of the disk in the lower-capacity cartridge. Due to radial displacement of the "A" burst relative to the "B" burst in a given servo sector, the "A" and "B" bursts are displaced on either side of the track centerline. When the head is positioned exactly over track centerline, approximately one-half of the "A" burst will be read followed by one-half of the "B" burst in a time displaced fashion. As the head moves off the center-line of a track, the amplitude of one burst decreases while the amplitude of the other burst increases depending on the direction of misalignment. In this manner, a position error signal can be derived from the relative amplitudes of the bursts by rectifying and peak detecting the readout from the head as it passes over the "A" and "B" bursts, and determining the difference in amplitude between the bursts.

Where the width of the higher-density read/write head 4 is significantly less than the pitch of the lower-density track 2, an A/B burst amplitude reading of the type depicted in FIG. 1B will be produced. FIG. 1C illustrates a typical A/B servo feedback waveform derived from the A/B burst amplitude pattern of FIG. 1B. As can be observed in both FIGS. 1B and 1C, the relatively small head width of higher-density read/write head 4 produces saturation regions 10 in the A/B burst amplitude signal and A/B servo feedback waveform generated by the track following circuitry. These saturation regions contain no useful servo information, inasmuch as any shifting of the read/write head relative to track center-line which occurs while the head is in the saturation region produces no change in the A/B servo feedback waveform and therefore cannot be detected.

Figure 2C:
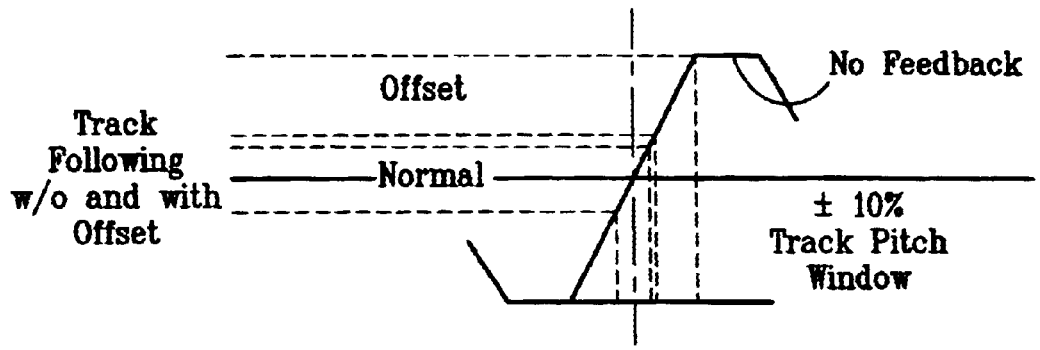
FIG. 2C shows the manner in which injection of "static" offset into the track following loop of a removable cartridge disk drive, as illustrated in FIGS. 2A–2B, positions a higher-density read/write head near the saturation region of the servo feedback waveform.

The difficulties encountered in using the prior art static offset technique to eliminate sideband interference when a higher-density head writes data over a lower-density data track become more apparent upon consideration of FIG. 2C. As can be seen in FIG. 2C, application of the static offset to eliminate the sideband on either side of track centerline produces a constant state offset condition wherein the higher-density head is located along a region of the A/B servo feedback waveform unacceptably near the saturation region of the waveform. Small deviations from the optimum head offset position during sideband erasing operation can move the head into the saturation region, resulting in no useful feedback and, in effect, loss of servo capability.

Further, in removable media drives, a second generation, higher capacity drive usually must be able to read and write on first-generation media as well. The first-generation media was written with a first-generation drive. The head width of the first-generation drive is larger than the head width of the second-generation drive, and thus the tracks written are larger than those on the second-generation drive.

Prior Solutions Overview

Referring once again to FIG. 1A, depicting a portion of the magnetic medium, there is shown an A region 300 and a B region 301. The border between the A region 300 and the B region 301 defines the center of a track 302. A data region 302 follows the A and B regions 300, 301, and may also follow a gap (not shown). In the example of FIG. 1A, the A region 300 precedes the B region 301 and occurs once for a given track 131 in the control region 140 of each sector 132. Generally, in even numbered tracks, the amplitude of the "A" burst increases as one moves toward the outer diameter of the disk while the amplitude of a "B" burst increases as one moves toward the inner diameter. The reverse is true for odd numbered tracks; that is, the amplitude of the "B" burst increases as one moves toward the outer diameter of the disk while the amplitude of an "A" burst increases as one moves toward the inner diameter. The track number usually increases as one moves from the outer diameter to the inner diameter. Of course, known exceptions to these generalities exist, and the present invention in its various embodiments, with appropriate changes, applies to these exceptions as well.

In operation, a read/write head 4 traverses the magnetic medium in an attempt to read or write information along a particular track 131. The disk 130 is rotated in a direction such that the head 4 first traverses the A region 300, reading magnetic information, and then the B region 301, reading further magnetic information. By comparing information from the A region 300 and the B region 301, the disk drive 101 determines if the head 4 is on track.

To prevent the head 4 from reading extraneous data located on adjacent tracks 131, the width of the head 4 is preferably some fraction, such as 80%, of the width of the track 131. A head width of less than full track width also prevents the head 4 from overwriting the edges of adjacent tracks 131 during a write operation.

The A region 300 and B region 301 each comprise static magnetic data that is pre-written at the time of manufacturing on each disk 130. The magnetic data in each of A and B regions 300, 301 preferably comprises a predefined pattern of 1's and 0's (e.g., flux transitions or no flux transitions) otherwise referred to as a "burst." The terms "A burst" and "B burst" are sometimes used to denote a reading of data in the A region 300 and a reading of data in the B region 301, respectively. The disk drive 101 may measure the energy of the A and B bursts (i.e., the area underneath the signal waveform) or, in a preferred embodiment, may measure and store the highest signal peak of each of the A and B bursts using a peak detector or similar conventional device.

As noted, the head 4 reads burst data first from the A region 300 and then from the B region 301. The head 4 typically does not remain precisely centered in the track 304, but may stray from the track center 302 from time to time during a reading or writing process. The A and B embedded servo data may be used to re-align the head 4 in the track center 302.

FIG. 1B is a graph showing how the amplitude of the A and B burst signals varies from the track center 302. In FIG. 1B, the amplitude 306 of the A burst, for example, increases until it reaches a maximum indicating a saturation region 10 when the head 4 is positioned at the edge of the track 304 (i.e., entirely within the A region 300). The A burst amplitude 306 then steadily decreases as the head 4 leaves the A region 300 and enters the adjacent B region 301. It may be observed that the A burst amplitude 306 overlaps with adjacent B burst amplitudes 308, due to the fact that the head 4 straddles at least part of an A region 300 and a B region 301 where the overlaps occur.

The servo loop within the disk drive 101 preferably operates to prevent the head 4 from straying completely in either the A region 300 or B region 301 and thereby prevent saturation. More specifically, the servo loop measures the difference between the A and B amplitudes and generates a servo error signal indicative of the distance from the track center 302. FIG. 1C is a graph of an A/B servo feedback waveform 309 associated with the servo pattern of FIG. 1A. The servo loop within the disk drive preferably operates to provide track following correction prior to the head 4 reaching a saturation region 10, at which point useful feedback information is no longer provided to the disk drive 101.

Although this technique may be effective, it burdens the storage media device with additional processing each time an older generation storage media is placed in a subsequent generation storage media device. The present invention eliminates the need for the intense processing required by the above described prior solutions. Older generation storage media would be accessible to subsequent generation storage media devices without concern for the sideband interference. As the storage media would be dedicated to one format type (i.e. either a first generation storage media format or subsequent generation storage media format), the storage media devices would process the media in its entirety without regard for the information presently found on the storage media. That is first generation storage media processed by second generation storage media devices would only contain second-generation storage media device information. In the event that the processed first generation storage media is then placed in a first generation storage media device, the format information may be updated and the first generation storage media may then be processed in accordance with the first generation storage media device. However, any information which was previously processed by the second generation storage media device on the first generation storage media would be discarded during the subsequent first generation storage media device processing. In doing this, the present invention drastically reduces processing performed by the subsequent generation storage media devices when processing older generation storage media.

System Overview and Processing

Figure 3:
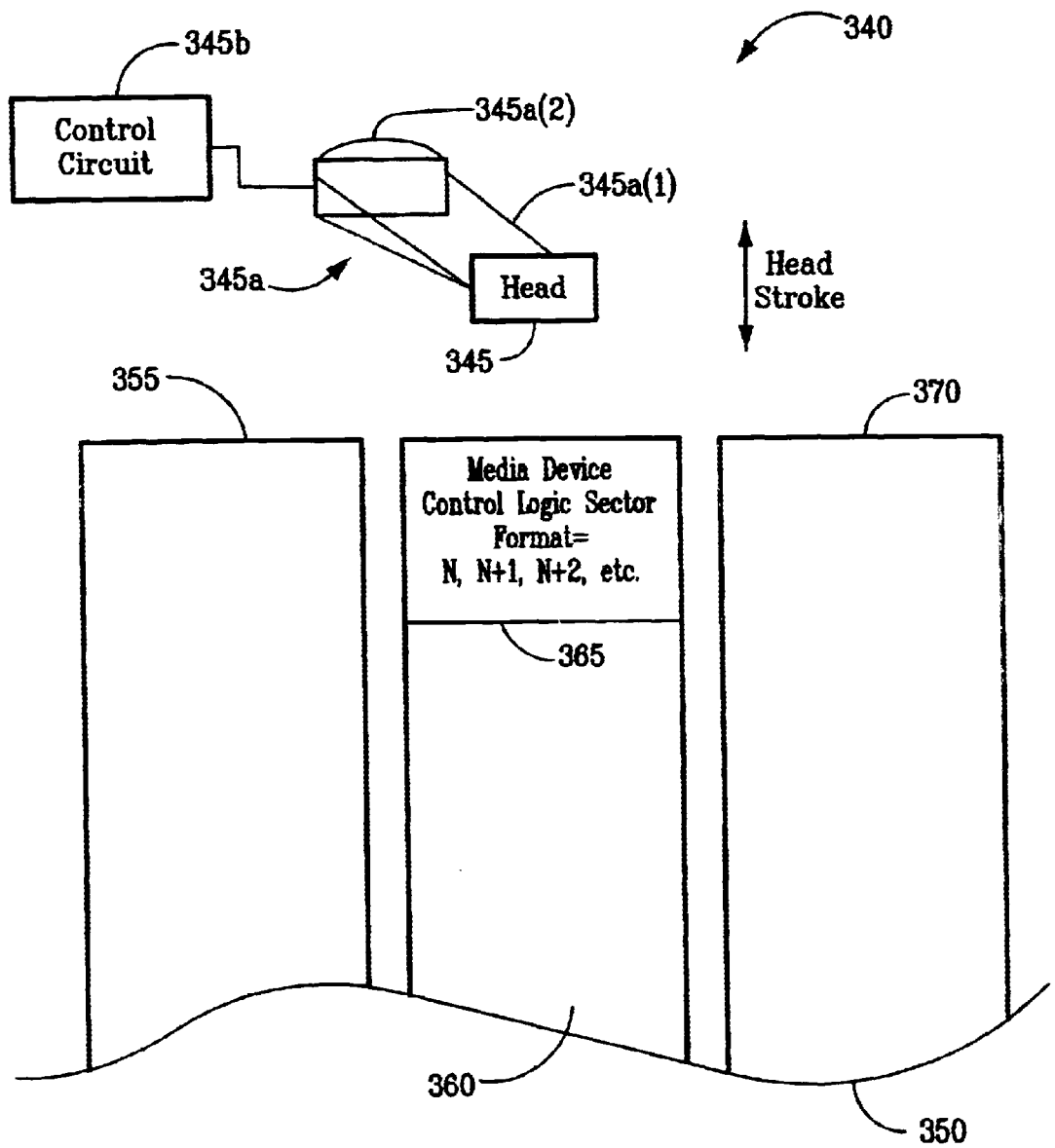
FIG. 3 is a block diagram of a media storage device in accordance with the present invention.
Figure 4:
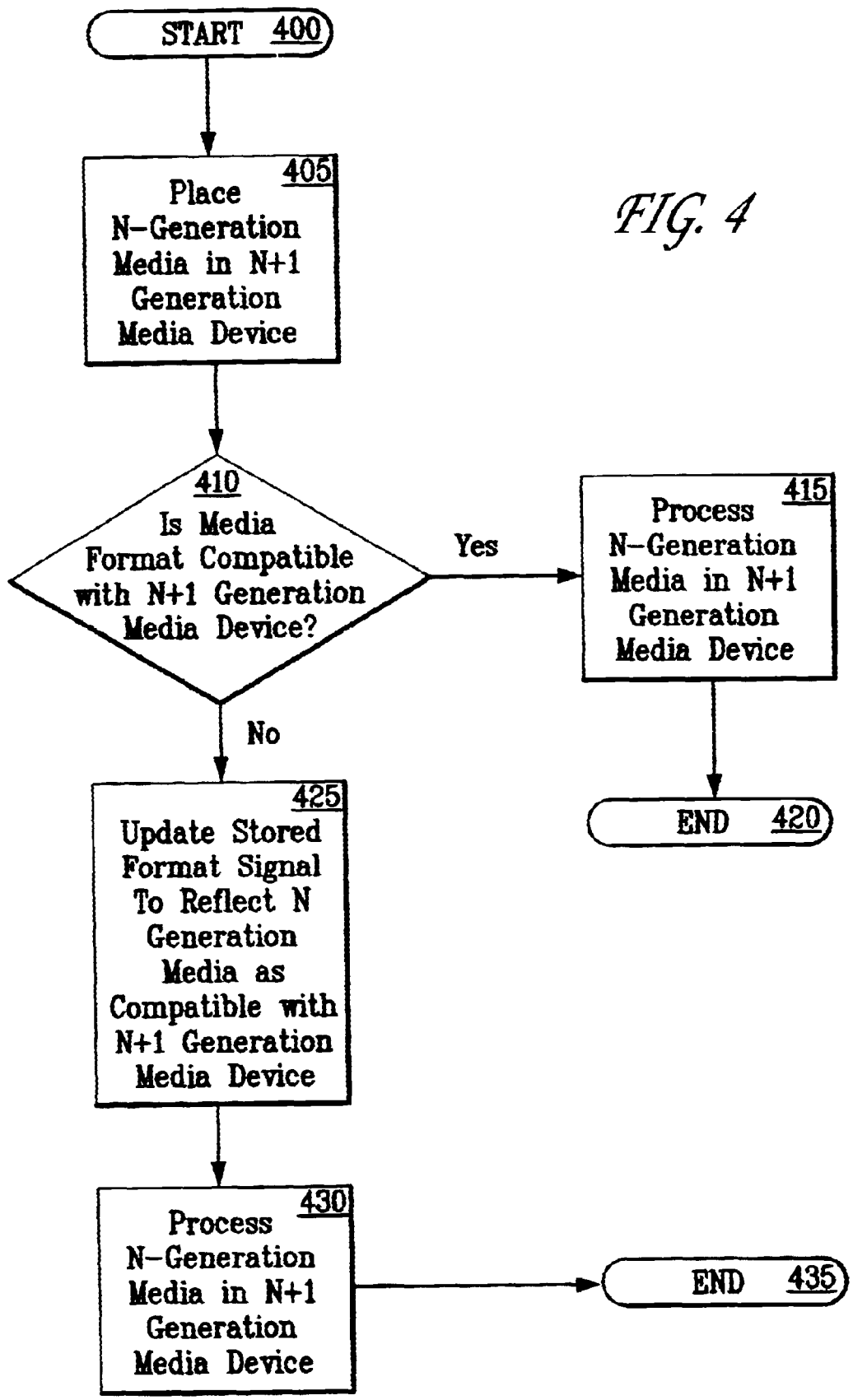
FIG. 4 is a flowchart of the processing performed on a storage media in accordance with the present invention.

FIGS. 3 and 4 illustrate the operation of the present invention and its relation to prior solutions to the above described problem. FIG. 3 shows components of exemplary storage media device 340. Read/write head 345 moves in a path relative to storage media 350, as indicated by the arrows, to process information stored or to be stored on storage media 350. As shown, read/write head is located at the end of actuator mechanism 345a which is, itself, [is] electronically coupled to control circuit 345b. Actuator mechanism 345a comprises a suspension arm 345a(1) and an actuator motor 345a(2) to move suspension arm 345a(1). In operation, control signals are provided by control circuit 345b to said actuator mechanism 345a such that read/write head can be placed proximate to media 350. Storage media 350 has a plurality of tracks 355, 360, and 370 which can receive and store information provided by read/write head 345. In addition, tracks 355, 360, and 370 can be processed by read/write head 345 to retrieve information stored. FIG. 3 further shows storage media 350 as having storage media device control logic sector 365 which contains format information. Storage media device control logic sector 365 may maintain a pointer which indicates the format state of storage media 305. Storage media device control logic sector 365 is processed by read/write head 345 of storage media device 340 such that if the format state of storage media 350 is in accordance with the format state required by storage media device 340, storage media device 340 can perform operations on storage media 350. However, if the contrary is true, read/write head 345 may update the format state found in storage media device control logic sector 365 in an effort to make the format state of storage media 350 compliant with the format state of storage media device 340.

FIG. 4 illustrates the processing performed by the present invention to realize efficient downward compatibility of storage media. Processing starts at block 400 and proceeds to block 405 where the storage media is placed in storage media device. A check is then performed at block 410 to determine if the storage media format state is compatible with the format state of the storage media device. If they are compatible, the storage media device performs storage media device operations (i.e. reading and/or writing of information or data) on the media at block 415. After which processing terminates at block 420. However, if at block 410 it is determined that the storage media format state and storage media device format state are not compatible, the storage media device may update the stored format state on the storage media at block 425 in an effort to make the storage media format state compliant with the storage media device format state. From there, the storage media device is free to perform storage media device operations (e.g. read and/or writing of information or data) at block 430. From there processing ends at block 430.

Conclusion

In sum, the present invention provides a system and process allowing efficient downward compatibility of storage media among several generations of storage media devices. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of storage media and storage media devices. The various techniques described herein may be implemented in hardware or software, or a combination of both. Preferably, the techniques are implemented in programs executing on computing hardware found in the media device that each may include a processor, and a storage medium readable by the processor (including volatile and non-volatile memory and/or storage elements). Each program is preferably implemented in a machine or object level programming language to communicate with the computing hardware. For example, the programs can be implemented in assembly or machine language, if desired. In any case, the language may be a compiled or interpreted language. Each such program is preferably stored on a device (e.g., ROM ) that is readable by the media device for configuring and operating the media device.

Although an exemplary embodiment of the invention has been described in detail above, those skilled in the art will readily appreciate that many additional modifications are possible in the exemplary embodiment without materially departing from the novel teachings and advantages of the invention. Accordingly, these and all such modifications are intended to be included within the scope of this invention.

What is claimed is:

1. In a disk drive for use with a data-storage disk, said disk drive having a read/write head for use on a data-storage disk, a method allowing for the compatibility of data-storage disks with said disk drive, the method comprising the steps of:

reading said data-storage disk for an indicator, said indicator being located in the control logic sector of said data-storage disk, said indicator providing format information of said data-storage disk; and processing said indicator by said disk drive to determine if said data-storage disk is compatible,
   wherein said disk drive overwrites said indicator if said disk-storage disk is not compatible.

2. The method of claim 1, wherein said processing step further comprises the step of comparing said indicator found on said disk-storage disk with a pre-determined indicator when determining compatibility.

3. The method of claim 2, wherein said processing step further comprises the step of reading said predetermined indicator from a storage area in said drive, said storage area comprising any of fixed storage and removable storage media.

4. The method of claim 1, wherein said reading step further comprises the step placing said read-write head proximate to said control logic sector of said data-storage disk.

5. A memory device bearing computer executable instructions for instructing a central processing unit to carry out the steps recited in claim 1.

6. A disk drive for use with a data-storage disk, comprising:

an actuator mechanism comprising:
      a suspension arm mechanically coupled to a data-transducing head so as to cause a cooperative movement between the suspension arm and the head, the suspension arm being placed proximate to said data-storage disk; and
      an actuator motor mechanically coupled to the suspension arm, the actuator motor generating an output that causes the cooperative movement between the suspension arm and the head; and
      a control circuit coupled to said actuator mechanism providing control signals to said actuator mechanism such that data is read and/or written to said data-storage disk through said data-transducing head,
      whereby in operation, said control circuit provides signals to said actuator mechanism to read the control logic sector of said data-storage disk for a compatibility indicator, wherein if said indicator shows incompatibility, said control circuit directs said data-transducing head of said actuator mechanism to write a compatible indicator.

\* \* \* \* \*